Nov. 2, 1954 R. K. STEINBERG 2,693,552

GASEOUS STORAGE TUBE

Filed Aug. 23, 1950 5 Sheets-Sheet 1

INVENTOR
RICHARD K. STEINBERG
BY Dwight D. Mooney
ATTORNEY

Nov. 2, 1954 | R. K. STEINBERG | 2,693,552

GASEOUS STORAGE TUBE

Filed Aug. 23, 1950 | 5 Sheets-Sheet 2

INVENTOR
RICHARD K. STEINBERG
BY Dwight D. Mooney
ATTORNEY

Nov. 2, 1954 R. K. STEINBERG 2,693,552

GASEOUS STORAGE TUBE

Filed Aug. 23, 1950 5 Sheets-Sheet 3

INVENTOR
RICHARD K. STEINBERG

BY Dwight D. Mooney
ATTORNEY

INVENTOR
RICHARD K. STEINBERG
BY Dwight D. Mooney
ATTORNEY

Nov. 2, 1954 R. K. STEINBERG 2,693,552

GASEOUS STORAGE TUBE

Filed Aug. 23, 1950 5 Sheets-Sheet 5

INVENTOR
RICHARD K. STEINBERG
BY Dwight D. Mooney
ATTORNEY

United States Patent Office 2,693,552

Patented Nov. 2, 1954

2,693,552

GASEOUS STORAGE TUBE

Richard K. Steinberg, Poughkeepsie, N. Y., assignor to International Business Machines Corporation, New York, N. Y., a corporation of New York Application August 23, 1950, Serial No. 180,943

18 Claims. (Cl. 315—168)

This invention relates to gaseous discharge tubes and more particularly to such a tube of the glow transfer type for counting electrical pulses.

One of the principal difficulties encountered in tubes of this type found in the prior art is that of accurate glow transfer from one count indicating element to the next count indicating element in response to a pulse to be counted. Such difficulty resides chiefly in spurious glow transfer to the wrong counting finger or to a plurality of counting fingers. One method of avoiding such spurious glow transfer involves the use of at least three electrodes of the same functional type.

Another counting arrangement of the prior art involves an uneven spacing between the count indicating electrodes and another electrode common thereto in that a single count indicating electrode is more closely spaced to the common electrode than any of the remaining count indicating electrodes. The first pulse to be counted causes the glow to exist to the common electrode from the count indicating electrode most closely spaced thereto. Each subsequent pulse to be counted merely initiates a glow between the next higher count indicating element and the common electrode so that when the tube has reached its full digital capacity a glow exists between each count indicating electrode and the common electrode. The tube is restored to its original stable condition by extinguishing all of the glow simultaneously. One of the disadvantages of such operation is that the higher the digital capacity of the tube the higher the required current surge at the end of each cycle of operation to restore the tube to its original stable condition. This requirement, therefore, necessitates the use of circuit means external to that required for counting to effect extinguishment of the glow at the end of each counting cycle.

It is the principal object of this invention to provide a novel gaseous discharge tube wherein the above disadvantages are eliminated.

It is another object to provide a gaseous discharge counting tube of the glow transfer type wherein each count indicating element along its entire effective length is arranged in substantially uniform spaced relation to every other electrode of the tube.

It is a further object to provide a gaseous discharge counting tube wherein the direction of the transfer of the glow is determined solely by the voltages applied to certain electrodes.

It is another object to provide a novel gaseous discharge tube of the glow type wherein a glow discharge is sequentially transferred through a plurality of controlled ionization compartments in a preselected order.

It is another object to provide a gaseous discharge counter tube including a plurality of cathodes each having a number of elements dependent upon the counting capacity of the tube and being geometrically formed to define an ionic leakage path adapted to lower the breakdown voltage of a particular volume within the tube.

It is a further object to provide a novel gaseous discharge tube of the glow transfer type wherein the existence of a glow discharge at a preselected place within the tube produces an ionization which insures that the glow will be transferred to a preselected element of the tube in response to a certain subsequent electrical manifestation.

It is a still further object to provide a novel gaseous discharge tube of the glow transfer type including a cathode having a plurality of elements formed and arranged to isolate and confine the glow discharge to certain preselected elements within the tube when predetermined electrical conditions exist.

Other objects of the invention will be pointed out in the following description and claims and illustrated in the accompanying drawings, which disclose, by way of example, the principle of the invention and the best mode, which has been contemplated, of applying that principle.

Briefly, one embodiment of the gaseous discharge counter tube of the invention comprises two cathodes, each having a plurality of metallic fingers equally spaced along and secured to a current carrying ring and extended through two insulating spaces to form a generally cylindrical structure therebetween and two similar anodes, each also having a plurality of metallic fingers equally spaced along and secured to a current carrying ring and extended through the two insulating spaces to form a generally cylindrical structure therebetween concentric with but of less diameter than the cylindrical structure formed by the cathodes. Each finger of the electrodes between the spacers is parallel with every other finger of the electrodes. Each anode and one cathode have the same number of fingers, each equal in number to the digital capacity of the tube. The remaining cathode has one less finger and a third or starting cathode comprising only a single finger is provided in place of the missing finger of said remaining cathode to ensure that a certain preselected glow transfer will exist when the tube is in the zero or starting condition. Electrode voltages are changed in a certain cyclic manner to transfer the glow in one direction around the generally cylindrical structure to effect addition and in a different cyclic manner to transfer the glow in the other direction around the generally cylindrical structure to effect subtraction. The glow discharge is confined to the generally cylindrical structure by the application of a suitable coating to that portion of the electrodes external to the generally cylindrical structure.

A second embodiment is similar to the first except that the fingers of the cathodes and the starting electrodes are in the form of rectangular-shaped metal strips. These strips provide ionic isolation between the electrodes which tends to confine the transfer of the glow discharge to the desired position within the tube. Each of these strips define an ionization leakage path which permits increased ionization of a predetermined volume of the gaseous atmosphere which is intermediate the glow discharge and the position to which it should be transferred by the next electrical manifestation received.

Beginning with the starting finger and moving in one direction around the generally cylindrical structure formed by the cathode fingers, individual fingers of the upper cathode and lower cathode respectively are encountered in turn and in the opposite direction vice versa. Similarly, the individual fingers of the two anodes are alternately encountered in moving around the generally cylindrical structure formed by the anode fingers.

Figure 1:
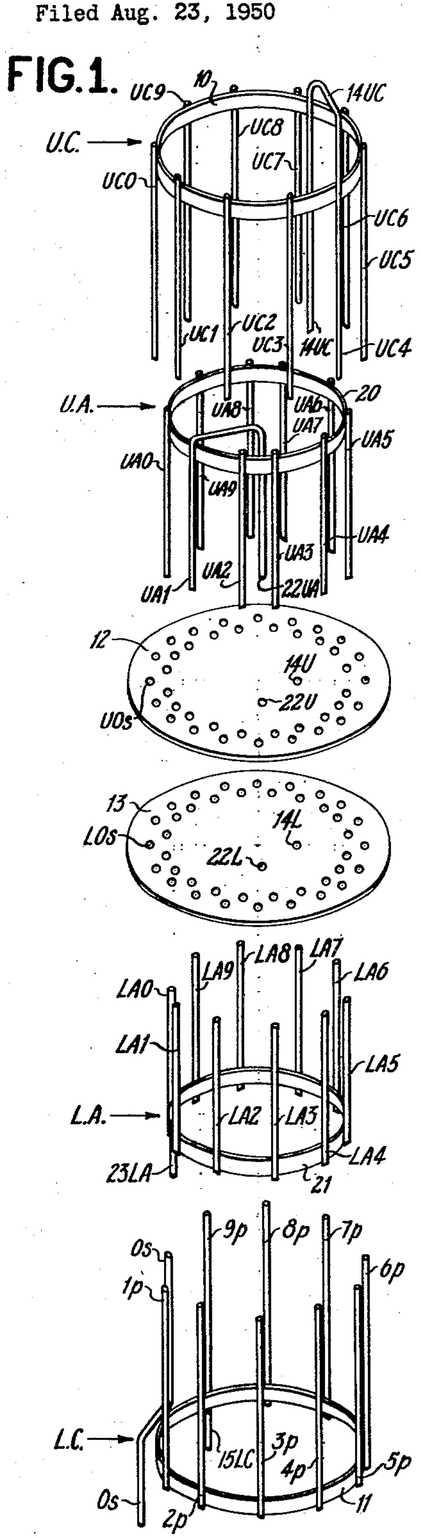
Fig. 1 is an exploded isometric view of the electrode structure of one embodiment of the tube of the invention.

The novel structure of the first embodiment of the tube of the invention will be described in connection with Figs. 1, 2 and 3.

Because of the physical placement of the electrodes within the envelope of the tube T, one anode is referred to as the upper anode and the other as the lower anode and one cathode is referred to as the upper cathode and the other as the lower cathode.

The upper cathode structure UC comprises an annular ring 10 and ten fingers UC0–UC9 each spaced equidistant from the two adjacent thereto around the circumference of the ring and secured thereto near one of their ends by any suitable means such as welding. The fingers extend from the ring 10 in parallel relationship so as to form a generally cylindrical structure.

The lower cathode structure LC comprises an annular ring 11 and nine fingers 1*p*–9*p* each secured to ring 11 and spaced equidistant from the two adjacent thereto as the corresponding rings US1–UC9 of the upper cathode. A tenth finger or starting electrode 0*s* used for placing the tube in a zero or starting condition is positioned as the tenth fingers of the lower cathode but is not connected to the ring 11, means being provided to energize it separately from the lower cathode structure LC.

The cathode structures and the starting finger are mounted within the envelope T so that the fingers of each extend through each of the spaced insulating discs 12 and 13. The upper cathode structure is energized through a lead wire 14UC welded to the ring 10, extending through the holes 14U and 14L in the discs 12 and 13 respectively and terminating on a pin (not shown) in the tube base. The lower cathode structure is energized through a lead wire 15LC welded to the ring 11 and terminating on a pin (not shown) in the tube base. Similarly, the starting finger 0*s* terminates on a pin (not shown) in the tube base and extends through the holes L0*s* and U0*s* in the discs 13 and 12 respectively so that it is positioned in alignment with the fingers of the lower cathode structure LC.

The upper anode structure UA is constructed similarly to the upper cathode structure UC and comprises an annular ring 20 and ten fingers UA0–UA9 aligned in parallel relationship. However, the upper anode structure is of less diameter than the cathode structure. The lower anode structure LA comprises the annular ring 21 and ten fingers LA0–LA9 aligned in parallel relationship, the structure being similar to and of the same diameter as the upper anode structure UA.

The anode structures are mounted so that the fingers of each extend through each of the insulating discs 12 and 13. The upper anode structure is energized through a lead wire 22UA welded to ring 20, extended through holes 22U and 22L in the discs 12 and 13 respectively and connected to a pin (not shown) in the tube base. The lower anode structure is energized through a lead wire 23LA welded to ring 21 and terminating on a pin (not shown) in the tube base. The lead wires 14UC and 22UA for energizing the upper cathode and upper anode respectively are extended through the discs 12 and 13 to lend mechanical rigidity to the structure and are so spaced that there is no danger of initiating a spurious glow because of their potentials. It has been found that the coating of the entire electrode structures and lead wires external to the generally cylindrical structure between the discs 12 and 13 confines the glow discharge exclusively to this generally cylindrical structure and thereby provides for more uniform and reliable operation of the tube.

Figures 2, 3:
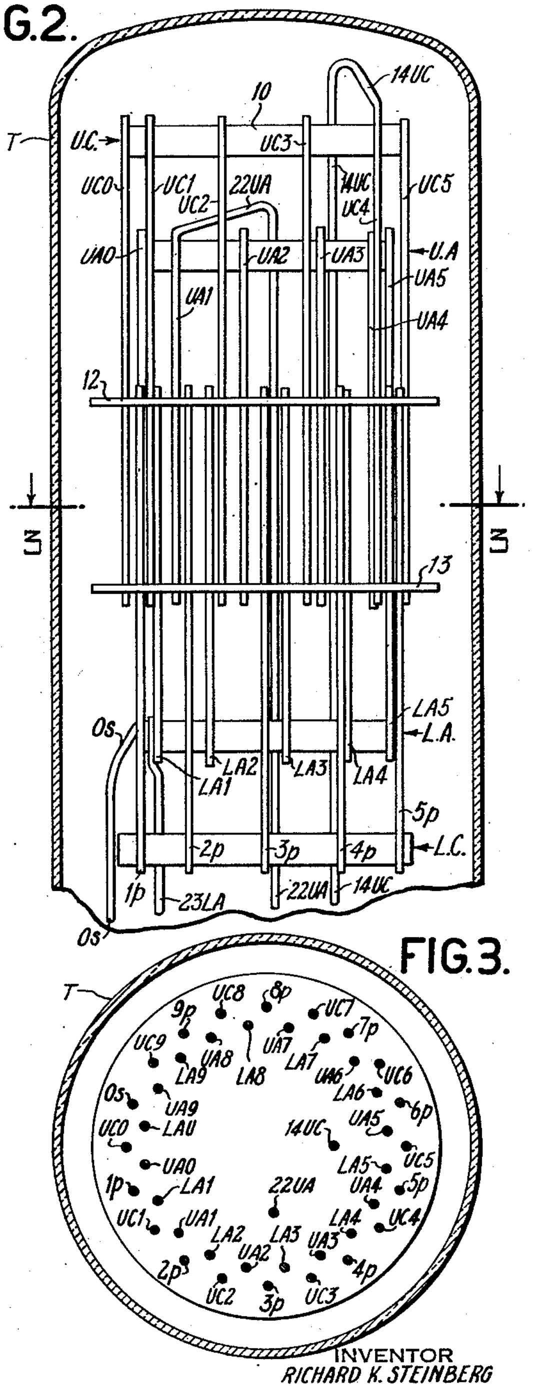
Fig. 2 is an elevation view, with the envelope cut away, of the tube of the embodiment shown in Fig. 1.
Fig. 3 is a cross-sectional view along the line 3—3 of Fig. 2.

Reference to Fig. 3 provides immediate appreciation of the spacing of the fingers. It is seen that the fingers of the cathode structures collectively define the same generally cylindrical structure and that the fingers of the anode structures collectively define another generally cylindrical structure having a smaller diameter than the former. It will be obvious from the operation of the invention that the fingers of all the electrodes may be aligned to form the same generally cylindrical structure or in any other manner that will permit predetermined glow transfer in response to preselected electrical manifestations sequentially applied to certain electrodes of the tube.

If a glow discharge exists between a first cathode and an anode and a second cathode having a voltage more negative than the first cathode is placed near the first cathode the ionization of the gas in the vicinity of the second cathode causes a glow discharge to be effected between the second cathode and the anode. Conversely, a single cathode and two anodes may be employed and an increased voltage drop between one anode and the cathode will cause the glow discharge to be transferred to exist across that drop. The novel electrode structure of the invention utilizes this phenomenon to effect a stepped glow transfer within the tube, which transfer is indicative of the number of received electrical manifestations to be counted.

Figure 4:
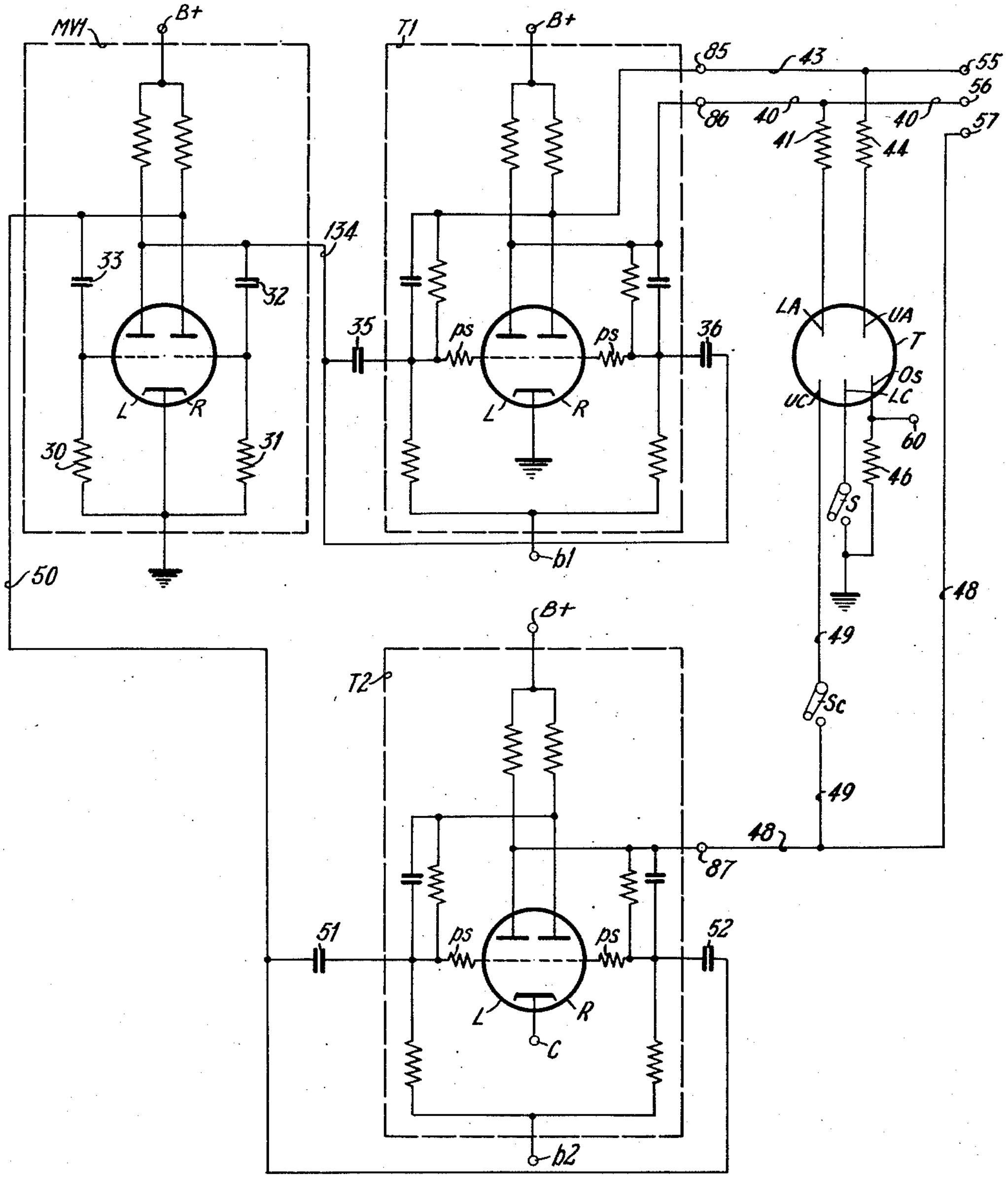
Fig. 4 is a circuit diagram of a novel circuit arrangement employed to operate the tube shown in Figs. 1, 2 and 3.
Figures 5, 6, 7, 8:
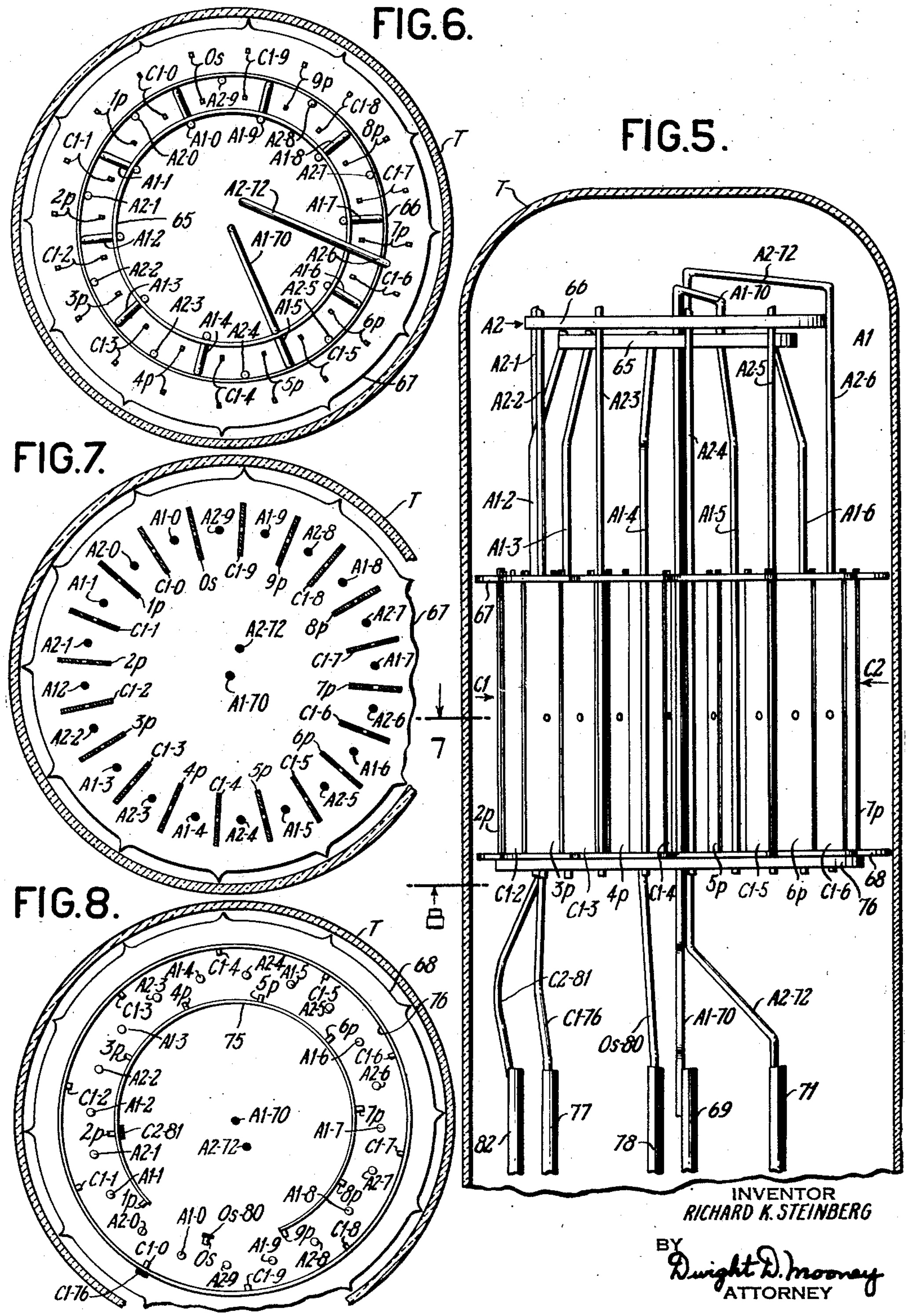
Fig. 5 is an elevation view, with the tube envelope cut away, of another embodiment of the tube of the invention.
Fig. 6 is a top view, with the top of the envelope cut away, of tube shown in Fig. 5.
Fig. 7 is a cross-sectional view taken along the line 7 of Fig. 5.
Fig. 8 is a cross-sectional view taken along the line 8 of Fig. 5.
Figure 9:
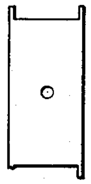
Fig. 9 is an elevation view of a cathode element employed of the embodiment of the tube shown in Fig. 5.

Referring to Fig. 4 a novel circuit arrangement for effecting glow transfer within the tube includes a multivibrator MV1 and trigger circuits T1 and T2. The multivibrator MV1 and the triggers T1 and T2 each include a twin triode type tube having left and right triode sections which are designated as the tubes L and the tubes R respectively. Each of these circuits is conventional and will be described only to the extent required for an understanding of the invention.

The plates of all the tubes are connected through appropriate resistance to a terminal designated B+ to which a suitable voltage is applied. The multivibrator MV1 is of the conventional free-running type. The cathodes of the tubes L and R are connected directly to ground and the control grids are connected thereto through resistors 30 and 31 respectively. The plate of the tube L is connected through a capacitor 32 to the control grid of the tube R and the plate of the tube R is connected through a capacitor 33 to the control grid of the tube L. When the voltage is applied to the terminal B+ of MV1 current begins to flow in the plate circuits of the tubes L and R. A slight change in current, say an increase of current through the tube L, permits the continuous or free running of the multivibrator. When the current through the tube L increases the voltage at its plate decreases. This decreased voltage is transferred over the capacitor 32 to the control grid of the tube R to cause a decrease in the current flowing through the tube R. The increased voltage at the plate of the tube R is transferred over the capacitor 33 to the control grid of the tube L to further increase current through the tube L. This cumulative action continues until the current through the tube L reaches a maximum value and the current through the tube R becomes substantially zero. The action is then reversed and the current through the tube L reaches maximum value and the current through tube R becomes substantially zero. Hence, when the plate of the tube R is at a maximum positive value the plate of the tube L is at a maximum negative value and vice versa.

The triggers T1 and T2 are of the conventional type having two stable conditions alternately assumed in response to the simultaneous application of negative pulses of appropriate amplitude and duration to the control grids of tube L and R. In one stable condition tube L is conductive and the tube R is non-conductive, this condition is referred to as the Left condition. In the other stable condition the tube R is conductive and tube L is non-conductive, this condition is referred to as the Right condition.

The operation of these triggers is well known and a detailed description of such is deemed unnecessary. Parasitic suppressor resistors designated *ps* are connected to the control grids of the tubes L and R of both triggers. The plate of each tube is connected through a parallel connected resistor and capacitor to the suppressor resistor connected at its other end to the control grid of the other tube of the trigger. The cathodes of the tubes L and R of the trigger T1 are connected directly to ground and the cathodes of the tubes of the trigger T2 are connected to a terminal *c* to which an appropriate bias voltage is applied. The control grid of each of the tubes of the trigger T1 is connected through a suitable bias resistor to a terminal *b*1 to which a suitable bias voltage is applied. Likewise, the control grids of each of the tubes of the trigger T2 is connected through a suitable bias resistor to a terminal *b*2 to which a suitable bias voltage is applied.

The plate of the tube L of the multivibrator is connected as shown through a lead 34 and capacitors 35 and 36 to the control grids of the tubes L and R of the trigger T1 so that when the voltage at the plate of the tube L of the multivibrator assumes its maximum negative value the trigger T1 is switched from the stable condition it is in to its other stable condition.

The plate of the tube L of the trigger T1 is connected through a lead 40 and a resistor 41 to the lower anode structure (to lead 23LA, Fig. 2) of the tube T. The plate of the tube R of the trigger T1 is connected through a lead 43 and a resistor 44 to the upper anode structure (to lead 22UA, Fig. 2) of the tube T. Hence, when the trigger T1 is in the Left condition the voltage on the lower cathode is low and the voltage on the upper cathode is high and when the trigger is in the Right condition vice versa. The starting finger 0*s* is connected through a resistor 46 to ground and the lower cathode structure is connected through a lead 47 (lead 15LC, Fig. 2) and a switch S to ground. The plate of the tube L of the trigger T2 is connected by leads 48 and 49 and a switch S*c* to the upper cathode (lead 14UC, Fig. 2).

The tube R of the multivibrator MV1 is connected as shown through a lead 50 and capacitors 50 and 51 respectively to the control grids of the tubes L and R of the trigger T2. Hence, when the current through the tube R of the multivibrator assumes its maximum value the low voltage present on its plate is transferred to the control grids of the tubes L and R of the trigger T2 to switch that trigger from the stable condition it is in to its other stable condition. Hence, when the trigger T2 switches to the Left condition a decreased voltage is applied to the upper cathode of the tube T if the switch S*c* is closed. Likewise, a switching of the trigger T2 to the Right condition causes an increased voltage to be applied to the upper cathode. The leads 43, 40 and 48 are connected to the terminals 55, 56 and 57 respectively to provide for energization of other tubes similar to the tube T. To provide such energization the upper anode, lower anode and upper cathode structures respectively of the additional tubes are connected to the respective terminals. When such is accomplished the additional tubes operate exactly as the tube T.

The switch S*c* is normally open as shown so that voltage variations from the trigger T2 are not applied to the upper cathode. The switch S connecting the lower cathode structure to ground is placed in the open position as shown in order to effect a setting of the tube to the zero or starting position. Hence, when the switches S and S*c* are both in the opened condition and alternately high and low voltages are applied to the upper and lower anode structures respectively in response to a switching of the trigger T1 a glow is struck between one of the anodes and the starting finger 0*s*. Obviously, the glow will exist between the starting finger and a finger of the anode structure which is at the higher of the two voltages. Hence, the application of the voltage variations to the anodes will cause the glow discharge to transfer from one finger of one anode to another finger of the other anode existing always between one of these fingers and the starting finger 0*s*.

If it is assumed that the voltage on the lower anode structure is higher than that on the upper anode structure and that the switches S and S*c* are open it is immediately seen from the physical arrangement of Fig. 3 that a glow discharge will strike between the finger 0*s* and the finger LA0 of the lower anode structure and that the glow will remain in that position until the voltage relations of the electrodes are changed. The glow is struck to the finger LA0 of the lower anode structure in preference to any other finger thereof because it is closer to the finger 0*s* than any other finger of the lower anode structure.

If the voltage on the lower anode structure is higher than that on the upper anode structure the voltage at the plate of the tube R of the trigger T1 is higher than that at the plate of the tube L. Hence, the tube L is conducting and the tube R is non-conducting so that the trigger T1 is in the Left condition.

The actual transfer of the glow discharge within the tube to indicate the counting of pulses is explained by reference to Figs. 3 and 4 conjointly.

To effect counting of the negative pulses transferred to the upper cathode structure from the trigger T2 the switch S*c* is closed. After the switch S*c* is closed a negative voltage pulse is applied to the upper cathode structure to cause the glow discharge to transfer from the finger 0*s* to UC0 and thereafter exist between the fingers UC0 and LA0.

The trigger T1 then switches from the Right to the Left condition so that an increased voltage is applied from the plate of the tube R of the trigger T1 to the upper anode structure UA and a decreased voltage is applied from the plate of the tube L of the trigger T1 to the lower anode structure LA. Hence, the voltages applied to the anodes are interchanged so that the finger UA0 of the upper anode is now more positive than the finger LA0 of the lower anode. As a result the glow discharge is transferred from the finger LA0 to the finger UA0 and exists between the finger UC0 of the upper cathode and the finger UA0 of the upper anode.

Following the switching of the trigger T1 to the Left condition the negative voltage pulse applied to the upper cathode ends because the trigger T2 switches from the Left to the Right condition thereby applying a positive voltage pulse from the plate of the tube L thereof to the upper cathode structure. As a result, the voltage difference between the lower cathode and the upper anode is greater than that between the upper cathode and the upper anode. Accordingly, the glow discharge is transferred from the finger UC0 of the upper cathode to the adjacent finger 1*p* of the lower cathode and exists thereafter between the finger UA0 of the upper anode and the finger 1*p* of the lower cathode.

Afterwards the trigger T1 switches from the Left to the Right condition and the lower anode again becomes more positive than the upper anode so that the glow discharge is transferred from the finger UA0 of the upper anode to the adjacent finger LA1 of the lower anode and exists thereafter between finger 1*p* of the lower cathode and the finger LA1 of the lower anode.

The existence of the glow discharge between the finger 1*p* and LA1 indicates that one input pulse has been received by the tube T. The application of subsequent negative voltage pulses to the upper cathode causes a similar step-by-step transfer of the glow, the second input pulse causing it to be transferred to and exist between the finger 2*p* and the finger LA2, the third input pulse causing it to be transferred to and exist between the finger 3*p* and the finger LA3. This step by step transfer of the glow discharge is continued in response to each input pulse until finally the tenth input voltage pulse causes the glow discharge to again exist between the finger 0*s* and LA0. When this occurs a positive voltage pulse appears at the terminal 60 (Fig. 4) connected to the finger 0*s*. The positive pulses which appear at this terminal may be used to energize the next higher order.

Since the plate of the tube L of the multivibrator MV1 is connected to the control grids of the tubes of the trigger T1 and the plate of the tube R of MV1 is connected to the control grids of the tubes of the trigger T2 and the triggers are switchably responsive only to negative voltage pulses the trigger T1 is switched when maximum current flows through the tube L of MV1 and the trigger T2 is switched when maximum current flows through the tube R of MV1.

From the above explanation relative to the glow transfer it is seen that when the tube T is in the zero or starting condition (glow between 0*s* and LA0) with the lower anode more positive than the upper anode that the trigger T1 is in the Right condition, the tube L of the multivibrator MV1 is at maximum conduction and the trigger T2 is in the Right condition. Then the tube R of the multivibrator MV1 reaches maximum conduction and the trigger T2 is switched to the Left condition to apply a negative voltage pulse to the upper cathode (glow between UC0 and LA0), the trigger T1 remaining in the Right condition. When the tube L of the multivibrator again reaches maximum conduction the trigger T1 is switched to the Left condition (glow between UC0 and UA0) and the upper anode is made more positive than the lower anode, the trigger T2 remaining in the Left condition. Then the tube R of the multivibrator again reaches maximum conduction and the trigger T2 is switched to the Right condition (glow between 1*p* and UA0) to remove the negative voltage pulse from the upper cathode, the trigger T1 remaining in the Left condition. Finally the tube L of the multivibrator again reaches maximum conduction and switches the trigger T1 to the Right condition to again make the lower anode more positive than the upper anode (glow between 1p and LA1), the trigger T2 remaining in the Right condition. The circuit has now effected a counting of one manifestation and has completed one cycle of operation. This cycle is repeated continuously to advance the count indication of the tube T until the switch Sc is opened.

Such an arrangement finds particular application in record card controlled or other similar cyclically operable calculating devices. In such apparatus it is frequently desirable to register a certain predetermined number of counts during a preselected time interval. Hence, the switch Sc may be relay controlled or in the form of an electronic gate under the control of a record card. The fact that a single circuit arrangement may be employed to selectively control a large number of counting tubes eliminates the necessity in such apparatus of duplicating the circuit arrangement for driving the counting tube.

It is also obvious that a large number of circuit arrangements may be employed to drive the counting tube, such as those for applying a plurality of preselected sequential voltage changes to the tube in response to random pulses to be counted. Also, slight changes in any of the driving circuitry will cause the glow discharge to be transferred around the electrode structure of the tube in a clockwise direction as compared to the counterclockwise direction previously explained herein. Hence, the counting tube may be used with equal facility to effect addition and subtraction of electrical manifestations, the performance of addition or subtraction being determined solely by the voltage changes applied to the tube.

The reading out of the manifestations stores in the tube at any time may be effected in any suitable conventional manner, such as by the application of ten input pulses to the tube.

Referring more particularly to Figs. 5–10, the tube T includes anode structures A1 and A2, cathode structures C1 and 2, and a starting cathode 0s.

The anode structure A1 comprises an annular ring 65 and ten fingers A1–0 to A1–9, inclusive, each spaced equidistant from the two adjacent thereto around the circumference of the ring 65 and secured to the ring by any suitable means, such as welding.

The anode structure A2 includes an annular ring 66 and ten fingers A2–0 to A2–9, inclusive, each spaced equidistant from the two adjacent thereto around the circumference of the ring 66 and secured to the ring near one of their ends. It will be noted from the drawing that the ring 65 of the anode A1 is of less diameter than the ring 66 of the anode A2 and that the fingers of the anode A1 gradually slope outward from the ring and then extend parallel with the fingers of the anode A2 to form the same generally cylindrical structure as the fingers of the anode A2. All the fingers of the anodes extend downward through the insulating spacer discs 67 and 68 and terminate just below the lower spacer 68. These spacers hold the electrode structures in rigid alignment and have portions extending therefrom to contact the envelope of the tube and hence prevent lateral displacement of the structure. The electrode structures and the spacers are supported by the lead wires provided to carry electrical current to the particular electrodes. A pin 69 in the base (not shown) of the tube is secured to a lead A1–70 which is secured at its other end to the ring 65 of the anode A1. A pin 71 secured in the base of the tube is connected to a lead A2–72 having its other end connected to the ring 66 of the anode A2.

The cathode C1 comprises ten rectangular-shaped elements having spikes (Fig. 9) extending longitudinally from each corner thereof and having a small hole extending through its entire thickness at its center. These elements are mounted between the insulating spacers 67 and 68. Both spikes of each element extend through the upper insulating spacer 67 and one spike extends through the lower insulating spacer 68, the other spike being removed to permit easy connection of other elements within the tube. These elements are designated C1–0 to C1–9, inclusive, and are spaced in parallel relationship with each other and with the fingers of the anodes. The spikes of the elements C1–0 to C1–9, inclusive, which extend below the bottom insulating spacer 68 are connected together by a connection 75 to form a unitary electrical structure. This common connection 75 is connected to a lead wire C1–76 connected at its other end to a pin 77 in the base of the tube.

The cathode C2 comprises nine elements each similar to that employed by the cathode C1 and designated 1p to 9p, inclusive. These elements are mounted similarly to those of the cathode C1 except that the bottom spike thereof nearest to the connection 75 is removed and a common connection 76 employed to join the remaining lower spike of each element. These elements are in parallel alignment with and placed intermediate the two elements of the cathode C1 which are designated by a corresponding and a lower number, respectively.

It is seen from the drawing that there is no element of the cathode C2 intermediate the elements C1–0 and C1–9 of the cathode C1. Similarly aligned in this space is a starting cathode 0s similar to one of the elements of the cathode C2. The starting element is connected to a lead wire 0s–80 connected at its other end to a pin 78 in the base of the tube. The common connection 75 of the cathode structure C2 is connected to a lead wire C2–81 which is connected at its other end to a pin 82 in the base of the tube.

Figure 11:
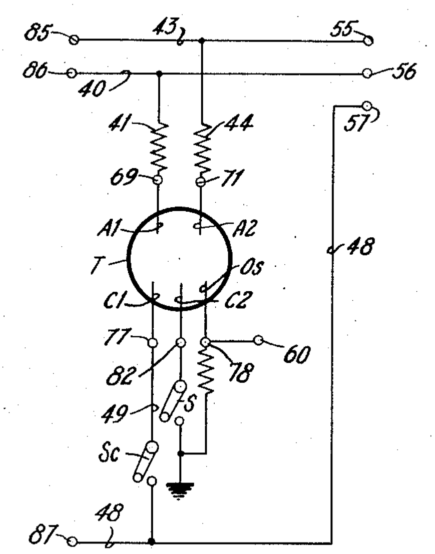
Fig. 11 is a circuit diagram showing suitable connections for operating the tube shown in Figs. 5–8.
Figure 10:
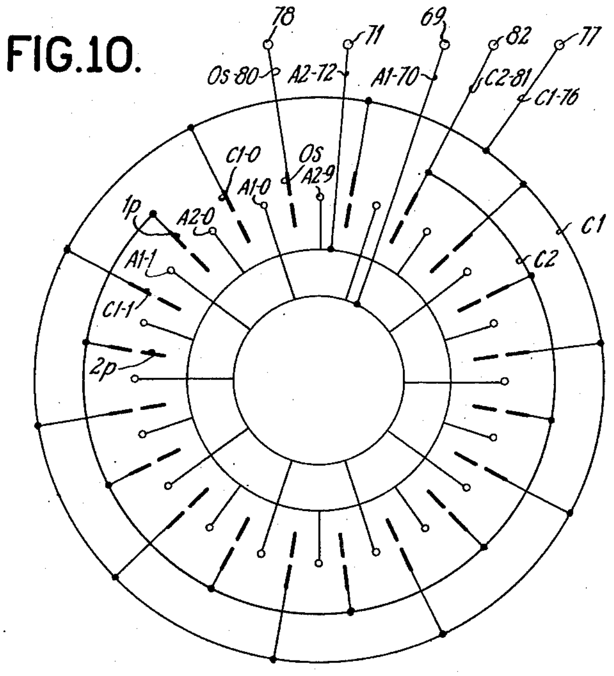
Fig. 10 is a diagrammatic showing of the electrode structure of the embodiment of the tube shown in Fig. 5 and the circuit connections thereto.

The operation of the second embodiment of the invention will be explained with reference to Figs. 4, 10 and 11. The terminals 85, 86 and 87 of Fig. 11 are connected to the similarly designated terminals of Fig. 4, the circuit of Fig. 11 replacing the circuit of Fig. 4 to the right of the terminals 85, 86 and 87. In operation the pins 69, 71, 77, 78 and 82 (Figs. 5 and 10) are connected to the correspondingly numbered points in the circuit diagram of Fig. 11 wherein the electrodes are diagrammatically represented as in Fig. 4.

When the switches S and Sc are both open the voltages on the anodes A1 and A2 will be alternately a maximum and a minimum value in accordance with the stable condition of the trigger T1. When the anode structure A2 is at the higher of the two voltage values a glow discharge will exist between the starting cathode 0s and the finger A2–9 and when the voltage applied to the anode structure A1 is the higher of the two voltage values the glow discharge will be transferred from the finger A2–9 to the finger A1–0 and thereafter exist between 0s and A1–0 until the voltages are again interchanged.

Assuming that the tube L of MV1 is at maximum conduction and that the triggers T1 and T2 are both in the Right condition, as was assumed in explaining the operation of the first embodiment, a glow discharge exists between 0s and A1–0. At this time there exists a leakage of ions through the hole in starting cathode so that the ionization of the volume of gas between 0s and A2–9 is increased to lower the breakdown voltage thereof and to insure that the glow discharge will be transferred from A1–0 to A2–9, if there is an interchange of anode voltages, in preference to any other finger of the electrode structure. Here it should be noted that if a voltage occurs which tends to transfer the glow discharge from the starting finger 0s to the element C1–0 the leakage of ions is insufficient to impair such a transfer or cause a spurious transfer. Such is the case because the glow discharge from 0s to A1–0 has resulted in an increased ionization of the region between A1–0 and C1–0. The increased ionization as a result of the glow discharge to A1–0 is substantially confined to this region because of the shape and position of the cathode element C1–0 which blocks and physically delays the migration of the ions therearound, the hole through C1–0 being so small that the leakage of ions therethrough is substantially negligible. The existence of the ionic leakage to produce preselected compartments within the tube having a decreased breakdown voltage and thereby to establish preferential glow transfer paths is vitally necessary to insure reliable operation of the tube and permit an increased voltage range in the values of the input pulses to be stored by the tube. Also changes in the characteristics of the tube with age or due to nonuniform fabrication is not as likely to cause spurious glow transfers as in the case in tubes known to the art.

When the switches S and Sc are closed and the tube begins to effect storage in response to the operation of the energizing circuit the tube R of MV1 reaches maximum conduction and the trigger T1 is switched to the Left condition to decrease the voltage applied to the cathode C1. Since C1–0 and 0s are closest to A1–0, the voltage drop between A1–0 and C1–0 is greater than that between A1–0 and 0s, and C1–0 is in a region having a lowered breakdown voltage due to the migration of ions from A1–0 the glow discharge is transferred from 0s to C1–0 and exists between A1–0 and C1–0.

The tube L of MV1 then reaches maximum conduction and the trigger T1 is switched to the Left condition so that the voltage drop between C1–0 and A2–0 is greater than that between C1–0 and A1–0 thereby causing the glow discharge to be transferred from A1–0 to A2–0 and to exist between C1–0 and A2–0. This transfer of the glow discharge is facilitated by a lowering of the breakdown voltage between C1–0 and A2–0 due to the leakage of ions through the hole in the element C1–0. This leakage is substantially confined to the compartment or region between C1–0 and 1p as is the migration of ions following the glow transfer.

Next, the tube R of MV1 reaches maximum conduction and the trigger T2 is switched to the Right condition. An increased voltage is applied to the cathode structure C1 thereby causing the voltage drop between A2–0 and 1p to be greater than that between A2–0 and C1–0 and the glow discharge is transferred from C1–0 to 1p and exists between A2–0 and 1p.

The tube L of MV1 again reaches maximum conduction and the trigger T1 is switched to the Right condition to again interchange the voltage on the anode structures. The voltage drop between A1–1 and 1p is then greater than that between 1p and A2–0 and the glow discharge is transferred to A1–1 and exists between 1p and A1–1. The glow discharge has now sequentially advanced to a stable condition to indicate the application of one pulse to the cathode structure C1 and the driving circuit is returned to its initial stable condition.

A similar glow transfer takes place in response to each subsequent pulse until the glow discharge again reaches the starting cathode 0s at which time an output pulse appears on terminal 60. Subsequent pulses cause a repetition of this operation.

Obviously, proper sequential application of similar voltages to the electrodes of the tube will effect a similar glow transfer in the opposite direction around the electrode structure. Hence, the tube may be used with equal facility to effect addition or subtraction.

It should be emphasized that the glow discharge may be transferred in either direction at any time without sacrificing any of the advantages of the tube. Always the ionic leakage provides one path of low breakdown voltage in each direction insuring that the glow will be transferred to the proper primed gap when the proper preselected voltages are applied to the tube. The fact that the cathode and the starter electrode are of rectangular shape, positioned within the path of glow transfer and considerably wider than the diameter of the anode fingers insures a natural shielding or isolation of the migration of the ions and the hole defined by each cathode and the starter electrode permits ionization of preselected regions within the tube. Both novel features are combined by the invention to produce an improved gaseous storage tube of increased reliability.

Figure 12:
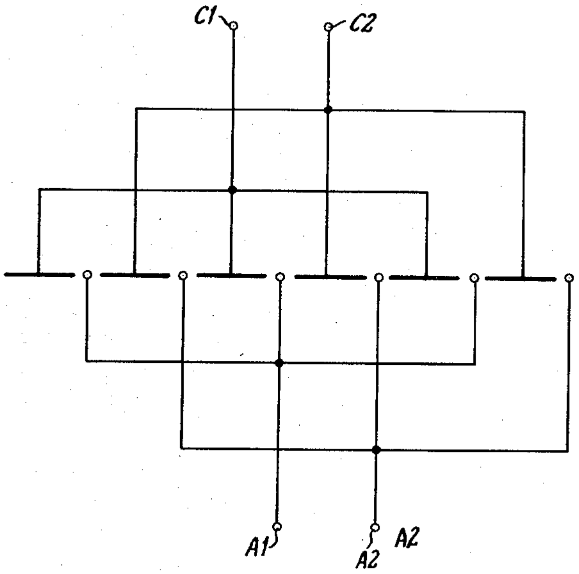
Fig. 12 is a diagrammatic showing of another embodiment of the tube of the invention.

Referring to Fig. 12 the diagrammatic representation illustrates another electrode arrangement for obtaining a positive glow transfer in the proper direction. The small circles represent anode elements, every other one being commonly energizable. One common group, termed the anode A1, is connected to terminal A1 and the other, termed the anode A2, is connected to a terminal A2. The lines intermediate the anode elements represent cathode elements and are similarly designated and connected together and to the terminals C1 and C2. Obviously, this embodiment may include any desired number of elements and a starting electrode. The circular arrangement of the structure to form a closed glow transfer path will permit its continuous operation in response to pulses. The transfer of the glow discharge from one stable position to another may be accomplished exactly as in the previous embodiments or by any other suitable means.

It is seen that the comparatively wide span of the cathode elements along which the glow progresses in travelling from one stable condition to the other decreases the likelihood of a spurious transfer to a more distant element.

Figure 13:
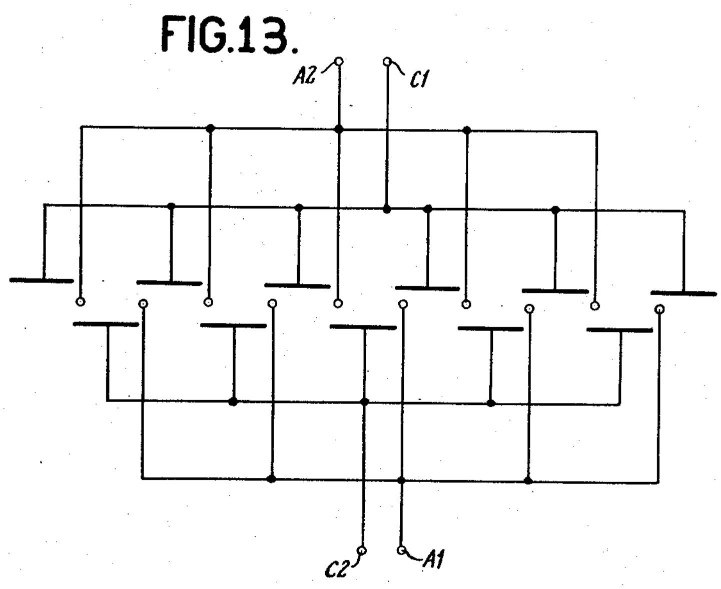
Fig. 13 is a diagrammatic showing of still another embodiment.

Fig. 13 illustrates another electrode arrangement similar to that of Fig. 12. The elements of the two anodes may be arranged in a circular path as well as in a straight line as shown. The elements of one cathode are arranged in a circular path on one side of that of the anode elements and the elements of the other cathode are arranged in a similar circular path on the other side of the anode elements. Each cathode element spans the distance between two adjacent anode elements and is mounted in spaced relation thereto. The operation and transfer of the glow discharge is similar to that of the embodiment shown in Fig. 12 and is clear from the explanations hereinbefore.

While there have been shown and described and pointed out the fundamental novel features of the invention as applied to a preferred embodiment, it will be understood that various omissions and substitutions and changes in the form and details of the device illustrated and in its operation may be made by those skilled in the art, without departing from the spirit of the invention. It is the intention, therefore, to be limited only as indicated by the scope of the following claims.

What is claimed is:

1. In a gaseous discharge tube of the glow transfer type wherein a glow discharge is transferred to a predetermined position within the tube in response to certain preselected electrical manifestations; two anodes each having a preselected number of commonly energizable elements arranged in parallel spaced relation; a first cathode having the same number of commonly energizable elements arranged in parallel spaced relation to each other and to the fingers of said anodes; and a second cathode having one less commonly energizable element than said first cathode and another similar element separately energizable from said cathode, all said elements being arranged in parallel spaced relation to the elements of said first cathode and anodes.

2. In a gaseous discharge tube wherein the position of a glow discharge indicates the number of electrical manifestations applied thereto; a plurality of cathodes and a plurality of anodes, said cathodes and anodes each having a plurality of commonly energizable elements arranged in predetermined parallel relationship; and circuit means connected and arranged to apply preselected electrical manifestations to said tube in response to a single electrical manifestation applied thereto to effect a preselected transfer of said glow discharge.

3. The gaseous discharge tube as set forth in claim 2 wherein said cathode elements are formed to provide an ionic leakage path and are interspaced between said anode elements to be responsive to said discharge thereby providing a lower breakdown voltage for a preselected region adjacent said discharge.

4. In a gaseous discharge counter tube wherein the position of the stable existence of a glow discharge within the tube is indicative of the number of pulses counted; two cathodes and two anodes each having a number of digital representing elements dependent upon the counting capacity of the tube, and means for mounting said cathodes and anodes in spaced relation and confining said glow discharge to a preselected area thereof where each of said elements is everywhere parallel to every other element.

5. The gaseous discharge counter as set forth in claim 4 wherein the elements of said anodes are in the form of fingers, the elements of said cathodes are of larger cross sectional area than the elements of said anodes and each defines an ionic leakage path for lowering the breakdown voltage of a preselected gaseous volume within the tube.

6. In a gaseous discharge counter tube of the glow transfer type having a closed glow transfer path; an upper and a lower insulating member mounted in spaced relation; a first anode having ten commonly energizable fingers respectively representing the digits 0–9 inclusive and extending in parallel spaced relation through said insulating members; a second anode having ten commonly energizable fingers respectively representing the digits 0–9 inclusive and extending through said insulating members in parallel spaced relation with the fingers of said first anode, the fingers of said second anode being uniformly interspersed between said members with the fingers of said first anode so that the fingers of the respective anodes are alternately positioned along the closed path; insulating means covering said anodes to confine said discharge to the space intermediate said insulating members; first cathode means comprising ten commonly energizable elements respectively representing the digits 0–9 inclusive and interspersed in parallel spaced relation to the anode fingers intermediate said insulating members, one element being positioned intermediate each finger of said first anode and the next higher digit representing finger of said second anode; and second cathode means comprising nine commonly energizable elements representing the digits 1–9 inclusive and one separately energizable element representing the digit 0; said element being interspersed in parallel spaced relation to the anode fingers intermediate said insulating members so that each element from the lowest to the highest is positioned intermediate the corresponding digit representing finger of said first anode and the next lower digit representing finger of the second anode, said one element being positioned intermediate the highest digit representing element of said second anode and the lowest digit representing element of said first anode.

7. The counter tube set forth in claim 6 wherein each of the elements of said cathode means consists of a metallic strip formed to define an ionic leakage path between adjacent fingers of the different anodes thereby lowering the breakdown voltage between adjacent strips of the cathode means.

8. In a gaseous discharge tube having a plurality of anode elements of the wire type; a plurality of cathodes having two planar surfaces and defining a continuous hole extending through each surface, one of said cathodes being mounted intermediate consecutive anode elements so that the hole through each cathode is directed toward two anode elements; and means for establishing glow discharge between one of said cathodes and one of said anode elements thereby creating an ionic leakage from said cathode in the direction of another anode element.

9. In a gaseous discharge tube having a plurality of stable conditions, first means connected to energize said tube, electrode means including successive electrodes for establishing a discharge sequentially transferrable in a cyclic manner in response to said first means formed to provide an ionic leakage path, and second means interspersed between said successive electrodes to be responsive to said discharge thereby providing an ionic leakage path to lower the breakdown voltage of a preselected region adjacent said discharge.

10. A gaseous discharge tube of the glow transfer type including a plurality of electrodes arranged in spaced relation for establishing a plurality of stable glow positions along a preselected path, said positions being sequentially occupied by said glow in response to the application of preselected voltages to the tube; means connected to apply said voltages to said tube to transfer said glow from any stable position to another predetermined stable position in step-by-step fashion; and glow isolating means positioned at preselected places along said preselected path for delaying the migration of ions from the region intermediate successive isolating means.

11. In a cyclically operable gaseous discharge storage device; electrode means for maintaining a glow discharge and sequentially transferring said glow a predetermined distance along a chosen path in response to each manifestation to be stored; and physical means interrupting said chosen path at preselected places therealong to divide said path into a plurality of ionic compartments for delaying the migration of ions therefrom, said physical means defining an ionic leakage path connecting said compartments to enable a sufficient leakage of ions therethrough during a preselected portion of each cycle to lower the breakdown voltage of a portion of the adjacent compartment.

12. In a cyclically operable gaseous discharge storage tube wherein a glow discharge is sequentially advanced to a preselected region to indicate a predetermined storage; a pulse source; anode means and cathode means each including a number of discrete elements dependent upon the storage capacity of the tube and interspersed to form a closed glow discharge path, circuit means connected to establish a predetermined glow discharge between an element of said anode means and an element of said cathode means; and connecting means between said source and said anode and cathode means so that each pulse from said source creates a plurality of equal voltage gradients between elements of said anode and cathode means, said cathode elements being in the form of flat strips each having a hole therethrough and a face substantially perpendicular to each of two elements of said anode means so that the cathode element in circuit with said glow discharge permits an ionic leakage therethrough to increase the ionization therefrom toward an anode element, and the next cathode element in the opposite direction delays the ionic migration therearound.

13. In a gaseous discharge tube having a plurality of stable conditions, means connected to energize said tube, said means including a circuit for generating timed voltage pulses and circuit switching means connected to selectively apply said pulses to said tube, electrode means for establishing a discharge sequentially and cyclically transferable in response to said means, and isolation and leakage means connected to be responsive to said discharge thereby providing a physical ionic leakage path to lower the breakdown voltage of a preselected region adjacent said discharge.

14. A gaseous discharge tube of the glow transfer type including a plurality of electrodes arranged in spaced relation for establishing a plurality of stable glow positions along a preselected path, said positions being sequentially occupied by said glow in response to the application of preselected voltages to the tube; first means including a plurality of circuits under the control of a free running oscillator and connected in preselected fashion to the electrodes of said tube; second means connected to apply said voltages to said tube to transfer said glow from any stable position to another predetermined stable position in step-by-step fashion, said second means including a switching device operable in preselected fashion and connected in circuit between said first means and the electrodes of said tube; and glow isolating means positioned at preselected places along said preselected path for delaying the migration of ions from the region intermediate successive isolating means.

15. In a gaseous discharge device of the glow transfer type having a plurality of electrical conditions indicated by the physical position of the glow discharge; first circuit means connected to energize said device and effect transfer of said glow discharge; and ionization control means adjacent said glow discharge to determine the direction of the next subsequent transfer of said glow discharge.

16. In a gaseous glow discharge device of the glow transfer type; electrode means comprising successive electrodes formed to sectionalize the migration of ions in said device; and ionic transfer means intermediate successive electrodes for effecting preselected directional transfer of ionization resulting from glow discharge.

17. A gaseous discharge device of the glow discharge transfer type having ionic control means for controlling the ionization of preselected volumes adjacent said glow discharge to determine the direction of the transfer and next subsequent position of the glow discharge.

18. In a gaseous discharge tube of the cold cathode type, a first plurality of successively arranged electrodes, a second plurality of electrodes interspersed between the electrodes of said first plurality, means connected to said electrodes for establishing a glow discharge therebetween which discharge is sequentially transferable in a cyclic manner in response to energization thereof, said second plurality of electrodes being individually formed to provide a region of high ion concentration on one side thereof and a region of lower ion concentration on the other side thereof through an ionic leakage path during the existence of a glow discharge thereto.

References Cited in the file of this patent

UNITED STATES PATENTS

| Number | Name | Date |
|---|---|---|
| 2,443,407 | Wales | June 15, 1948 |
| 2,621,313 | Steinberg | Dec. 9, 1952 |
| 2,627,054 | Hough | Jan. 27, 1953 |